(No Model.)
G. LARSEN.
TWO WHEELED VEHICLE.
No. 286,314. Patented Oct. 9, 1883.
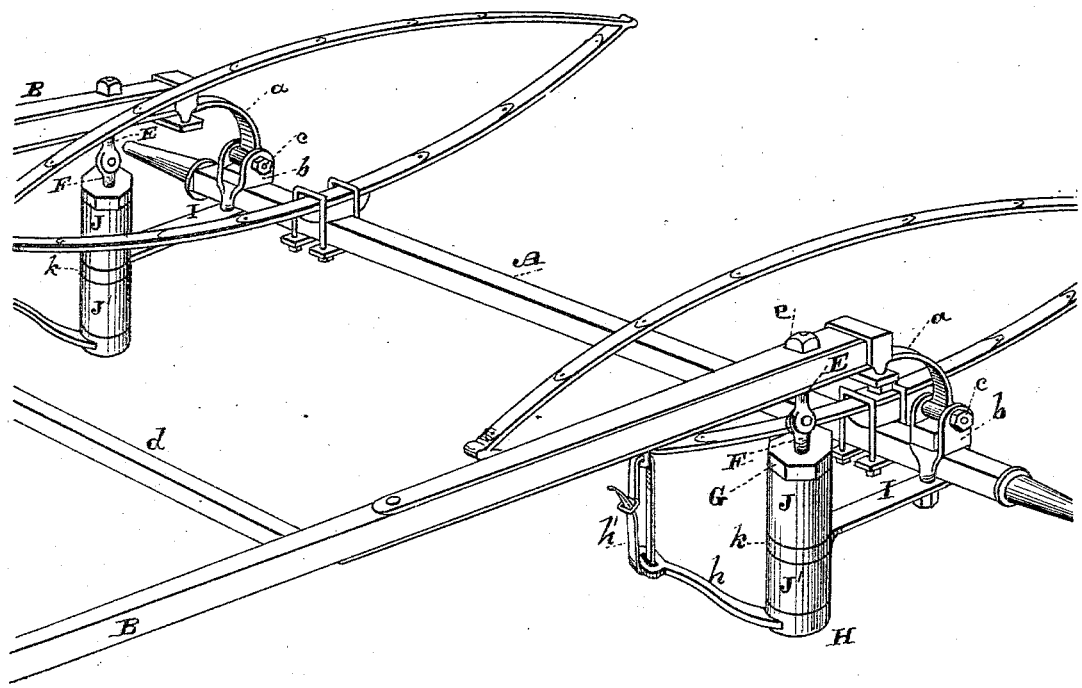
Witnesses,
Geo. H. Strong.
J. H. Nourse
Inventor,
Geo Larsen
By Dewey & Co.
Attorneys

UNITED STATES PATENT OFFICE.

GEORGE LARSEN, OF SAN LEANDRO, CALIFORNIA, ASSIGNOR OF ONE-HALF TO JOHN F. E. HOPPER, OF SAME PLACE.

TWO-WHEELED VEHICLE.

SPECIFICATION forming part of Letters Patent No. 286,314, dated October 9, 1883.

Application filed May 8, 1883. (No model.)

*To all whom it may concern:*

Be it known that I, GEORGE LARSEN, of San Leandro, county of Alameda, and State of California, have invented an Improved Two-Wheeled Vehicle; and I hereby declare the following to be a full, clear, and exact description thereof.

My invention relates to certain new and useful improvements in two-wheeled vehicles; and it consists in a novel connection between the shafts and axle, the object of which is to permit the independent movement of the shafts while affording support to the axle, to prevent it from turning, and also to enable me to regulate the height of the shafts, as I shall hereinafter fully explain.

Referring to the accompanying drawing, Figure 1 is a perspective view of my cart with the body left off.

A is the axle, to which the elliptical side springs are to be clipped, and which sustain the body (not here shown) in the usual manner.

B B are the shafts. These have the usual cross-bar, $d$. The rear ends of these shafts are connected with the axle by a hinged joint, such as is used in buggies, and commonly known as a "thill-coupling." This consists of the bar $a$, clipped to the shaft, and the bearing $b$, clipped to the axle, and in which the bar $a$ is pivoted by bolt $c$. In two-wheeled vehicles it is necessary to connect the axle, either directly or indirectly, with the shafts in such a manner that it cannot turn and precipitate the occupant. At the same time this connection must not be so rigid that the up-and-down movement of the shafts which is occasioned by the jogging of the horse shall be transmitted to the body through the axle. Therefore, while the hinged thill-coupling as herein shown provides for a connection by which the independence of the shafts is not lost, and their motion is consequently not transmitted to the axle, it yet needs an additional connection to prevent the axle from turning. This I accomplish as follows:

E is a bolt passing down through the rear end of the shaft, and secured by a top nut, $e$. The lower end of this bolt is slotted, and has pivoted within it a bolt, F. Upon the upper end of this is a flange, G, which is preferably a nut, to accomplish another object which I shall explain. Upon the lower end of bolt F is a tightening-nut, H, having a handle, $h$, secured to the shaft above by a strap, $h'$. The yoke I, which clips the bearing $b$ of the thill-coupling to the axle, is extended forward, and has an eye, $k$, formed in its end, which encircles the bolt F. Between the upper flange-nut, G, and this eye $k$ of yoke I is a rubber or elastic buffer or cushion, J, surrounding the bolt F, and between the lower nut, H, and the eye $k$ is a second buffer or cushion, J'. It will be seen that through the bolt F and the yoke I a further connection is made between the shaft and axle, and one which is at the same time sufficiently firm to hold the axle, and yet yielding, so that the shafts may have their motion without affecting the axle. The buffers J J', acting as springs, take away the shaft motion from the axle by not transmitting it. The bolt F may retain its perpendicularity and allow the shafts to have their movement because of its hinged connection with the bolt E in the shaft. The strap $h'$ acts as a nut-lock to prevent the nut H from working loose. By turning up this nut H by means of its handle $h$, the buffers may be held well in place and the whole device prevented from rattling.

The means I have herein described enable me to accomplish another result—namely, the adjustment of the shaft to different-sized horses. The flange G by being a nut can be turned up or down, thus allowing the nut H to be set up or down, in order to draw down the shafts or to allow them to be raised, and still hold the buffers tight. It is obvious that by extending the shafts behind the axle all the parts may be transferred back of the axle to produce the same result.

Having thus described my invention, what I claim as new, and desire to secure by Letters Patent, is—

1. In a two-wheeled vehicle, the shafts and axle, and a hinge-connection between them, in combination with a bolt pivoted to and suspended from the shaft, an arm or yoke secured to the axle and embracing or fitting the lower end of the bolt, and an elastic buffer or cushion between said arm or yoke and the shaft, substantially as and for the purpose herein described.

2. In a two-wheeled vehicle, the shafts and axle, and a hinge-connection between them, in combination with the bolt E, the bolt F, pivoted thereto, the flange G on said bolt, the nut H on its lower end, the arm or yoke I, clipped to the axle and having an eye, $k$, encircling bolt F, and the elastic buffers or cushions J J', encircling said bolt F and lying between the arm or yoke, and the flange G, and nut H, substantially as and for the purpose herein described.

3. In a two-wheeled vehicle, the shafts and axle, and a hinge-connection between them, in combination with the bolt E, the bolt F, pivoted thereto, the flange G on said bolt above, and the nut H below, having handle $h$ and strap $h'$ connecting it with the shaft, the arm or yoke I, clipped to the axle, and having eye $k$ encircling bolt F, and the elastic buffers or cushions J J', encircling said bolt F, and lying between the arm or yoke, and the flange G and nut H, substantially as and for the purpose herein described.

In witness whereof I hereunto set my hand.

GEORGE LARSEN.

Witnesses:
C. D. COLE,
J. H. BLOOD.